United States Patent
Furusawa et al.

(10) Patent No.: US 8,458,549 B2
(45) Date of Patent: Jun. 4, 2013

(54) DATA TRANSMISSION METHOD, DATA RECEPTION METHOD, MOBILE TERMINAL AND RADIO COMMUNICATION SYSTEM

(75) Inventors: Masayuki Furusawa, Yokohama (JP); Yousuke Iizuka, Yokosuka (JP); Yukihiko Okumura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 382 days.

(21) Appl. No.: 12/673,712

(22) PCT Filed: Aug. 13, 2008

(86) PCT No.: PCT/JP2008/064521
§ 371 (c)(1),
(2), (4) Date: Oct. 12, 2010

(87) PCT Pub. No.: WO2009/025221
PCT Pub. Date: Feb. 26, 2009

(65) Prior Publication Data
US 2011/0060964 A1 Mar. 10, 2011
US 2011/0214032 A2 Sep. 1, 2011

(30) Foreign Application Priority Data
Aug. 17, 2007 (JP) .............................. P2007-213183

(51) Int. Cl.
*G08C 25/02* (2006.01)
(52) U.S. Cl.
USPC ...................................................... 714/748
(58) Field of Classification Search
USPC .................. 714/748, 749, 807, 758
See application file for complete search history.

(56) References Cited

U.S. PATENT DOCUMENTS

| 5,983,382 | A  | * | 11/1999 | Pauls ............................. | 714/744 |
| 2004/0098655 | A1 | * | 5/2004 | Sharma ......................... | 714/758 |
| 2005/0097432 | A1 | * | 5/2005 | Obuchi et al. ................. | 714/800 |
| 2008/0307295 | A1 | * | 12/2008 | Sim et al. ...................... | 714/807 |
| 2010/0011272 | A1 | * | 1/2010 | Ferguson et al. ............. | 714/748 |
| 2010/0192045 | A1 | * | 7/2010 | Park et al. ..................... | 714/784 |
| 2010/0293444 | A1 | * | 11/2010 | Tzannes ........................ | 714/807 |
| 2011/0022935 | A1 | * | 1/2011 | McDaniel ..................... | 714/807 |
| 2011/0066927 | A1 | * | 3/2011 | Buckley et al. ............... | 714/807 |
| 2011/0239087 | A1 | * | 9/2011 | Tzannes ........................ | 714/758 |

FOREIGN PATENT DOCUMENTS

JP 2004-88388 A 3/2004
WO 03/090362 A1 10/2003

OTHER PUBLICATIONS

Office Action for Japanese Application No. 2007-213183 mailed Feb. 28, 2012, with English translation thereof (7 pages).

(Continued)

*Primary Examiner* — Yolanda L Wilson
(74) *Attorney, Agent, or Firm* — Osha Liang LLP

(57) ABSTRACT

A data transmission method according to the present invention includes the steps of: (A) adding a first CRC code to transmission data; (B) dividing the transmission data to which the first CRC code has been added into a plurality of encoded bit sequences; (C) adding a second CRC code to at least one of the divided encoded bit sequences; (D) performing error correction encoding processing on the encoded bit sequences; and (E) transmitting the encoded bit sequences on which the error correction encoding processing has been performed.

10 Claims, 6 Drawing Sheets

OTHER PUBLICATIONS

Office Action for Chinese Patent Application No. 200880103099.0 issued Jun. 4, 2012, with English translation thereof (14 pages).
International Search Report w/translation from PCT/JP2008/064521 dated Oct. 28, 2008 (5 pages).
Written Opinion from PCT/JP2008/064521 dated Oct. 28, 2008 (3 pages).
3GPP TSG-RAN Working Group 1 Meeting #50, R1-073310; "FEC Code Block-based CRC"; Nortel; Athens, Greece; Aug. 20-24, 2007 (5 pages).
3GPP TSG RAN WG1 Meeting #49-bis, R1-073108; "Analysis of per code block CRC and per transport block CRC"; Samsung; Orlando; Jun. 25-29, 2007 (3 pages).
3GPP TSG-RAN WG1 #50, R1-073268; "CRC for Multiple Code Block Transmissions", Qualcomm Europe; Athens, Greece; Aug. 20-24, 2007 (3 pages).
Seiichi Sampei; "Digital Wireles Transmission Technology" with English translation; Pearson Education; pp. 282-289 (19 pages).
Office Action dated Aug. 12, 2010 from European Application No. 08827596.1-2415, 5 pages.
Extended European Search Report for Application No. 11154635.4 dated Jul. 27, 2011 (5 pages).

* cited by examiner

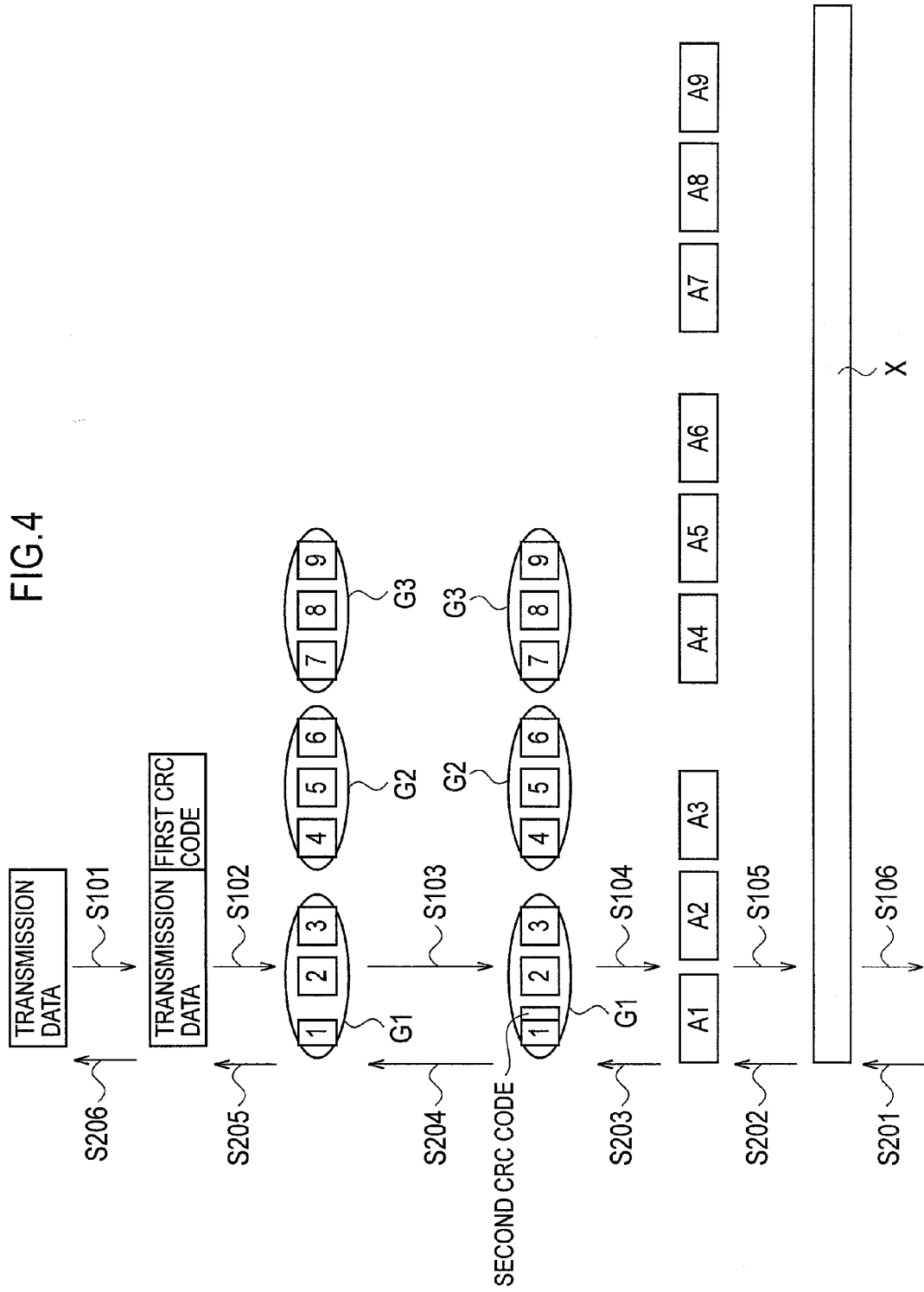

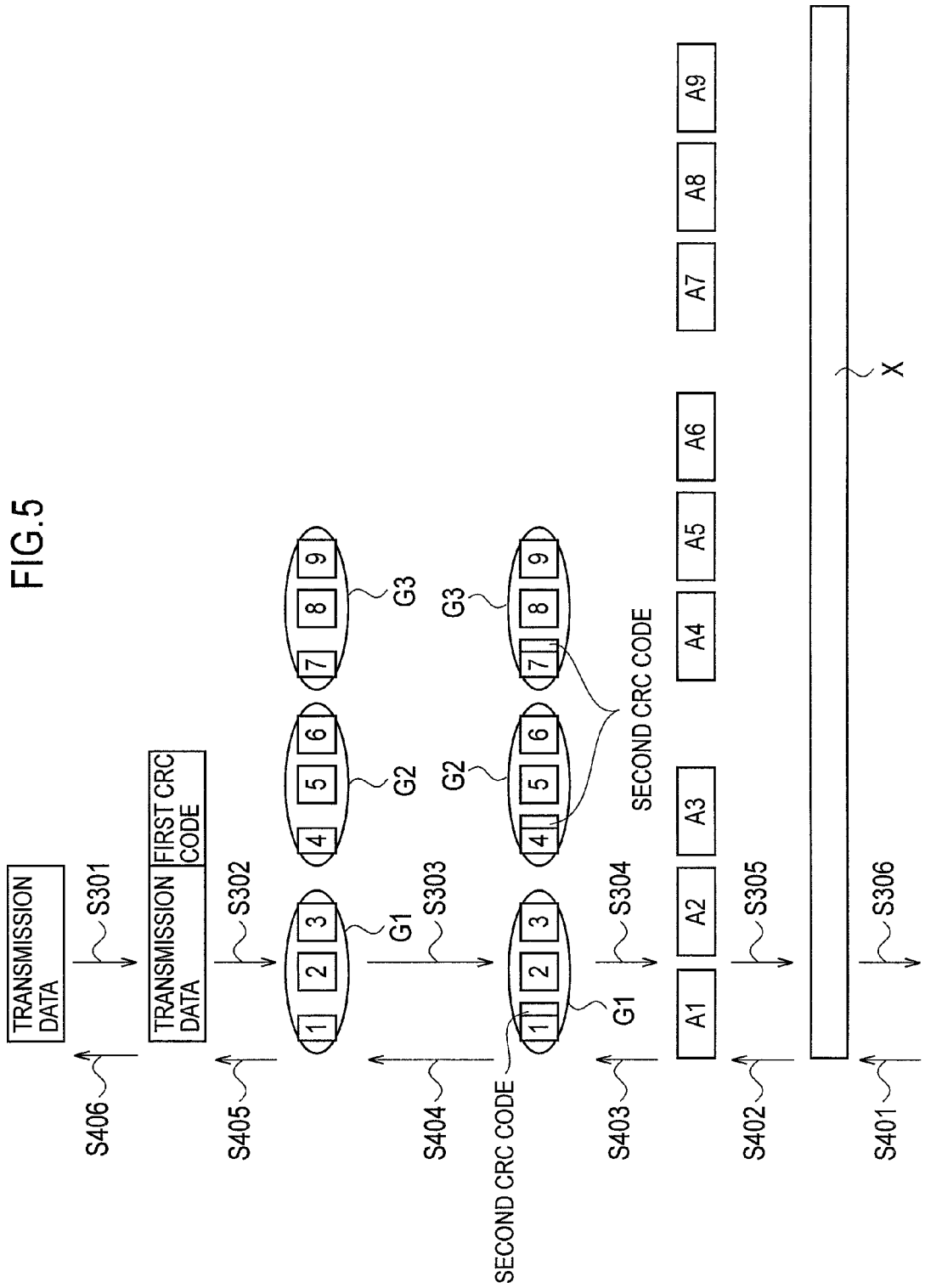

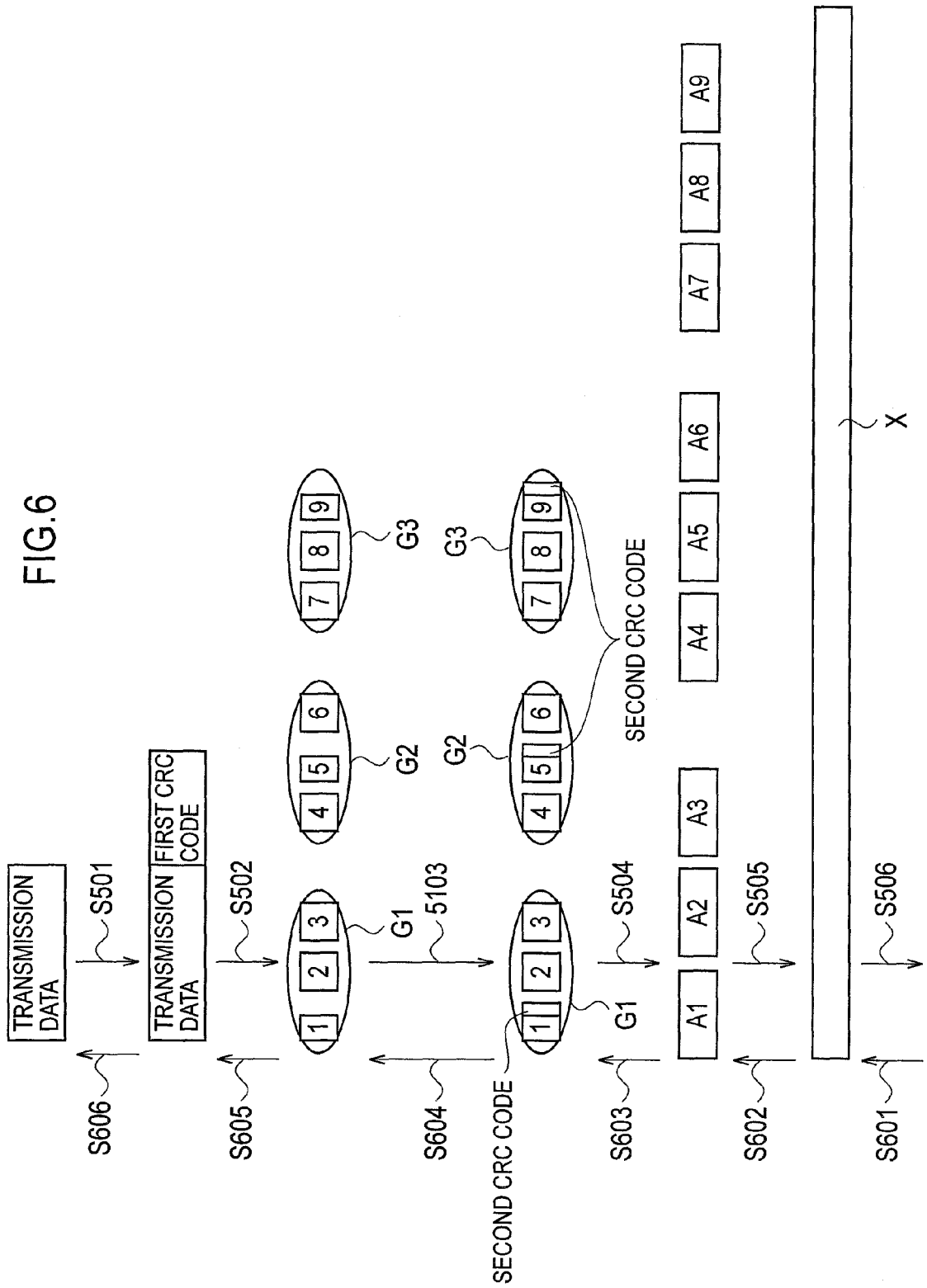

DATA TRANSMISSION METHOD, DATA RECEPTION METHOD, MOBILE TERMINAL AND RADIO COMMUNICATION SYSTEM

TECHNICAL FIELD

The present invention relates to a data transmission method, a data reception method, a mobile terminal and a radio communication system.

BACKGROUND ART

In a digital radio communication system, transmission quality (such as a bit error rate and throughput characteristics) depends on a radio wave propagation environment such as fading and shadowing, and transmission data transmitted by a transmitter apparatus might be received as erroneous data by a receiver apparatus.

In consideration of such circumstances, the digital radio communication system uses an error control technique for allowing the receiver apparatus to receive correct transmission data even in a poor radio wave propagation environment.

The error control technique is a technique of reducing the probability of bit error occurrences in the transmission data and of realizing a radio communication system having higher transmission quality even using the same received power.

Here, the error control technique can be roughly classified into forward error correction (FEC) processing and automatic repeat request (ARQ) processing.

Note that error correction encoding processing can be cited as the FEC processing. Specifically, in the error correction encoding processing, redundant bits are added to a bit sequence of transmission data according to a certain rule, thereby allowing restoration of bits erroneously received due to a radio wave propagation environment.

A receiver apparatus adopting the ARQ processing is configured to determine whether or not received data is correct and to send a retransmission request back to the transmitting side when an error is detected.

Here, FIG. 1 shows configurations of a transmitter apparatus 10 and a receiver apparatus 30 in a radio communication system using both ARQ processing and FEC processing.

As shown in FIG. 1, the transmitter apparatus 10 includes a transmission data generator unit 11, a CRC adder unit 12, a divider unit 13, an error correction encoder unit 14, an interleaver 15, a modulator 16, and a transmission controller unit 17.

Meanwhile, the receiver apparatus 30 includes a demodulator 31, a deinterleaver 32, an error correction decoder unit 33, a connector unit 34, a CRC checker unit 35, and a received data acquirer unit 36.

As shown in FIG. 2, in the transmitter apparatus 10, the transmission data generator unit 11 generates transmission data (a bit sequence). In Step S1001, the CRC adder unit 12 performs error detection encoding processing using a CRC (Cyclic Redundant Check) code and thus adds the CRC code (a parity bit sequence) to the transmission data (the bit sequence) in order to perform error detection processing in ARQ processing.

In Step S1002, the divider unit 13 divides the transmission data (the bit sequence) to which the CRC code (the parity bit sequence) has been added into encoded bit sequences #1 to #9 in units (bit size) for performing error correction encoding processing.

In Step S1003, the error correction encoder unit 14 performs the error correction encoding processing on the multiple encoded bit sequences #1 to #9. As a result, encoded bit sequences #A1 to #A9 to which redundant bits have been added are obtained.

In order to randomize errors occurring in a burst (burst errors) in the radio communication system, in Step S1004, the interleaver 15 performs interleaving for changing the order of the bit sequences in the transmission data containing the encoded bit sequences #A1 to #A9 according to a certain rule.

In Step S1005, the modulator 16 digitally modulates transmission data X (containing the encoded bit sequences #A1 to #A9) outputted from the interleaver 15, and then transmits the transmission data to a radio section.

Meanwhile, in the receiver apparatus 30, as shown in FIG. 2, the demodulator 31 converts a received signal into received data (a bit sequence) by demodulating the received signal in Step S2001.

In Step S2002, the deinterleaver 32 changes the order of the bit sequences in the received data that is the output from the demodulator 31 back to the original order of the bit sequences in the transmission data X according to a rule opposite to that adopted by the interleaver 15 in the transmitter apparatus 10.

In Step S2003, the error correction decoder unit 33 divides the received data (the bit sequence) outputted from the deinterleaver 32 into encoded bit sequences #A1 to #A9 in units that are the same as for the error correction encoding processing in the transmitter apparatus 10, and then performs error correction decoding processing.

In Step S2004, the connector unit 34 connects multiple encoded bit sequences #1 to #9 obtained by the error correction decoding processing. In Step S2005, the CRC checker unit 35 performs error detection processing (i.e. CRC check) using the CRC code added to the connected transmission data.

When no error is detected here, the receiver apparatus 30 transmits transmission acknowledgement information (ACK: Acknowledgement) concerning the received data to the transmitter apparatus 10. In response, the transmitter apparatus 10 transmits transmission data to be transmitted next.

On the other hand, when an error is detected, the receiver apparatus 30 transmits a retransmission request (NACK: Negative ACK) to the transmitter apparatus 10. In response, the transmitter apparatus 10 retransmits the same data as that previously transmitted.

Non-patent Document 1: "Digital Wireless Transmission Technology" written by Seiichi Sampei, Pearson Education As described above, the ARQ processing is a technique useful for achieving high transmission quality of the radio communication system.

Nevertheless, in the case of real-time data transmission, the receiver apparatus 30 receives all the transmission data (bit sequences) transmitted by the transmitter apparatus 10, checks the CRC code, and sends a retransmission request. For this reason, there is a problem that transmission time is delayed depending on a radio environment.

DISCLOSURE OF THE INVENTION

The present invention has been made in the light of the above problem. It is an object of the present invention to provide a data transmission method, a data reception method, a mobile terminal and a radio communication system, by which a delay time required by a receiver apparatus to detect an error and to return ACK/NACK to a transmitter apparatus can be reduced as much as possible for more real-time data transmission.

A first aspect of the present invention is summarized as a data transmission method including the steps of: (A) adding a first CRC code to transmission data; (B) dividing the transmission data to which the first CRC code has been added into a plurality of encoded bit sequences; (C) adding a second CRC code to at least one of the divided encoded bit sequences; (D) performing error correction encoding processing on the encoded bit sequences; and (E) transmitting the encoded bit sequences on which the error correction encoding processing has been performed.

In the first aspect, in the step (C), the divided encoded bit sequences can be grouped into a plurality of groups, and the second CRC code can be added to any of the encoded bit sequences in at least one of the plurality of groups.

In the first aspect, in the step (C), the second CRC code can be added to any of the encoded bit sequences in each of the plurality of groups.

In the first aspect, in the step (C), the second CRC code can be added to any of the encoded bit sequences in a leading group among the plurality of groups.

In the first aspect, in the step (C), the second CRC code can be added to a leading one of the encoded bit sequences in the leading group among the plurality of groups.

A second aspect of the present invention is summarized as a data reception method including the steps of: dividing received data into a plurality of encoded bit sequences, and performing error correction decoding processing on the divided encoded bit sequences; performing error detection processing, by using the second CRC code added to one or more of the encoded bit sequences on which the error correction decoding processing is performed; transmitting a first retransmission request for a specific encoded bit sequence, when an error is detected in the specific encoded bit sequence; acquiring transmission data to which a first CRC code has been added by connecting the plurality of encoded bit sequences, when no error is detected in the plurality of encoded bit sequences; performing error detection processing by using the first CRC code; and transmitting a second retransmission request for the transmission data, when an error is detected in the transmission data.

In the second aspect, the second CRC code can be added to any of the encoded bit sequences in at least one of a plurality of groups.

In the second aspect, the second CRC code can be added to any of the encoded bit sequences in each of the plurality of groups.

In the second aspect, the second CRC code can be added to any of the encoded bit sequences in a leading group among the plurality of groups.

In the second aspect, the second CRC code can be added to a leading one of the encoded bit sequences in the leading group among the plurality of groups.

A third aspect of the present invention is summarized as a mobile terminal including: a first CRC adder unit configured to add a first CRC code to transmission data; a divider unit configured to divide the transmission data to which the first CRC code has been added into a plurality of encoded bit sequences; a second CRC adder unit configured to add a second CRC code to at least one of the divided encoded bit sequences; an error correction encoder unit configured to perform error correction encoding processing on the encoded bit sequences; and a transmitter unit configured to transmit the encoded bit sequences on which the error correction encoding processing has been performed.

In the third aspect, the second CRC adder unit can be configured to group the divided encoded bit sequences into a plurality of groups, and to add the second CRC code to any of the encoded bit sequences in at least one of the plurality of groups.

A fourth aspect of the present invention is summarized as a radio communication system including a transmitter apparatus and a receiver apparatus, wherein the transmitter apparatus includes: a first CRC adder unit configured to add a first CRC code to transmission data; a divider unit configured to divide the transmission data to which the first CRC code has been added into a plurality of encoded bit sequences; a second CRC adder unit configured to add a second CRC code to at least one of the divided encoded bit sequences; an error correction encoder unit configured to perform error correction encoding processing on the encoded bit sequences; and a transmitter unit configured to transmit the encoded bit sequences on which the error correction encoding processing has been performed; and the receiver apparatus comprised: an error correction decoder unit configured to divide received data into a plurality of encoded bit sequences, and to perform error correction decoding processing on the divided encoded bit sequences; a second CRC checker unit configured to perform error detection processing by using the second CRC code added to one or more of the encoded bit sequences on which the error correction decoding processing has been performed; a first retransmission requester unit configured to transmit a first retransmission request for a specific encoded bit sequence, when no error is detected in the specific encoded bit sequence; a connector unit configured to connect the plurality of encoded bit sequences, when no error is detected in the plurality of encoded bit sequences, and to acquire transmission data to which a first CRC code has been added; a first CRC checker unit configured to perform error detection processing by using the first CRC code; and a second retransmission requester unit configured to transmit a second retransmission request for the transmission data, when an error is detected in the transmission data.

BRIEF DESCRIPTION OF THE DRAWINGS

FIG. 4 is a diagram showing operations of the transmitter apparatus and receiver apparatus according to the first embodiment of the present invention.

FIG. 5 is a diagram showing operations of a transmitter apparatus and a receiver apparatus according to a second embodiment of the present invention.

FIG. 6 is a diagram showing operations of a transmitter apparatus and a receiver apparatus according to a third embodiment of the present invention.

BEST MODES FOR CARRYING OUT THE INVENTION

First Embodiment of the Invention

Figure 1:
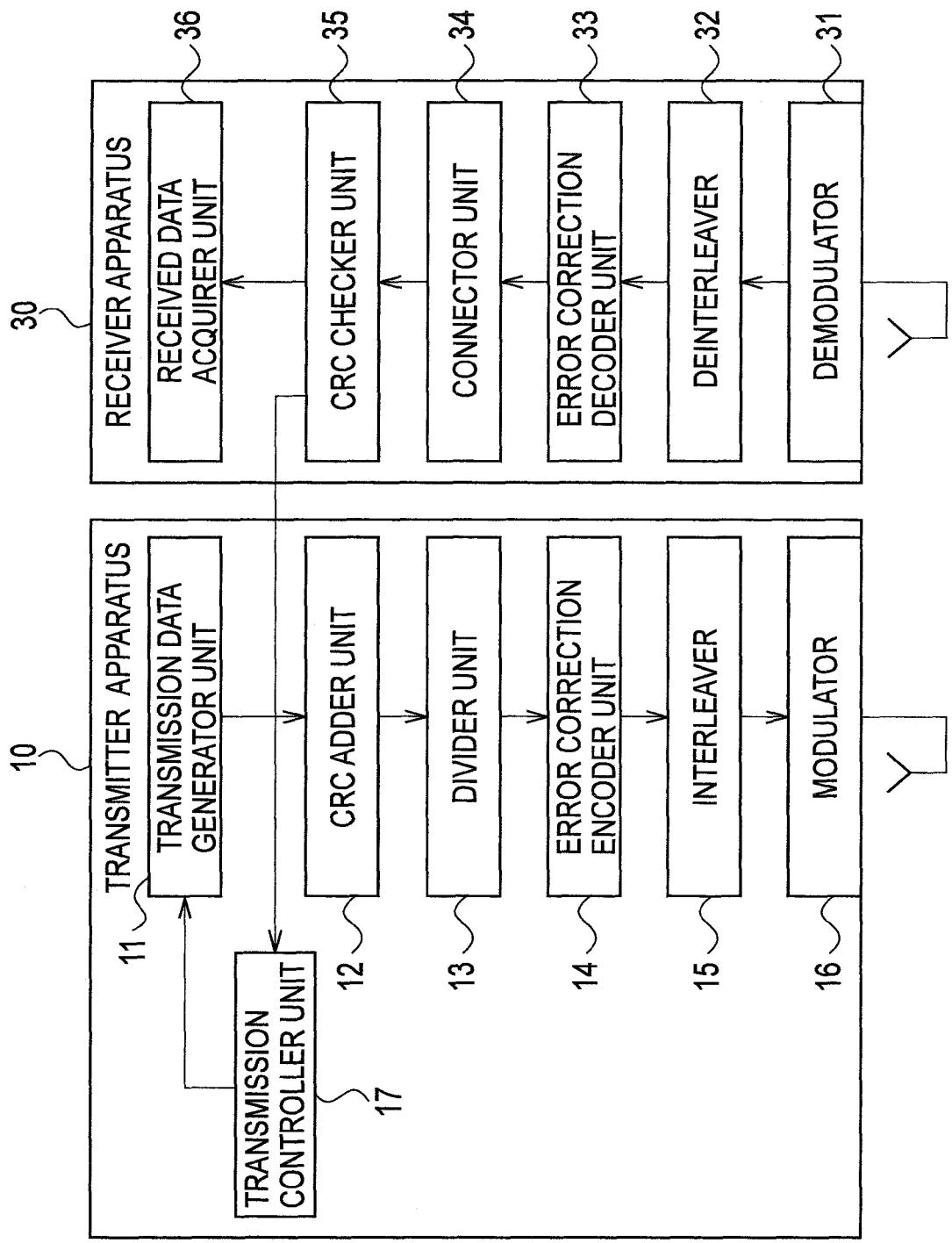
FIG. 1 is a functional block diagram of a transmitter apparatus and a receiver apparatus that are conventional.
Figure 2:
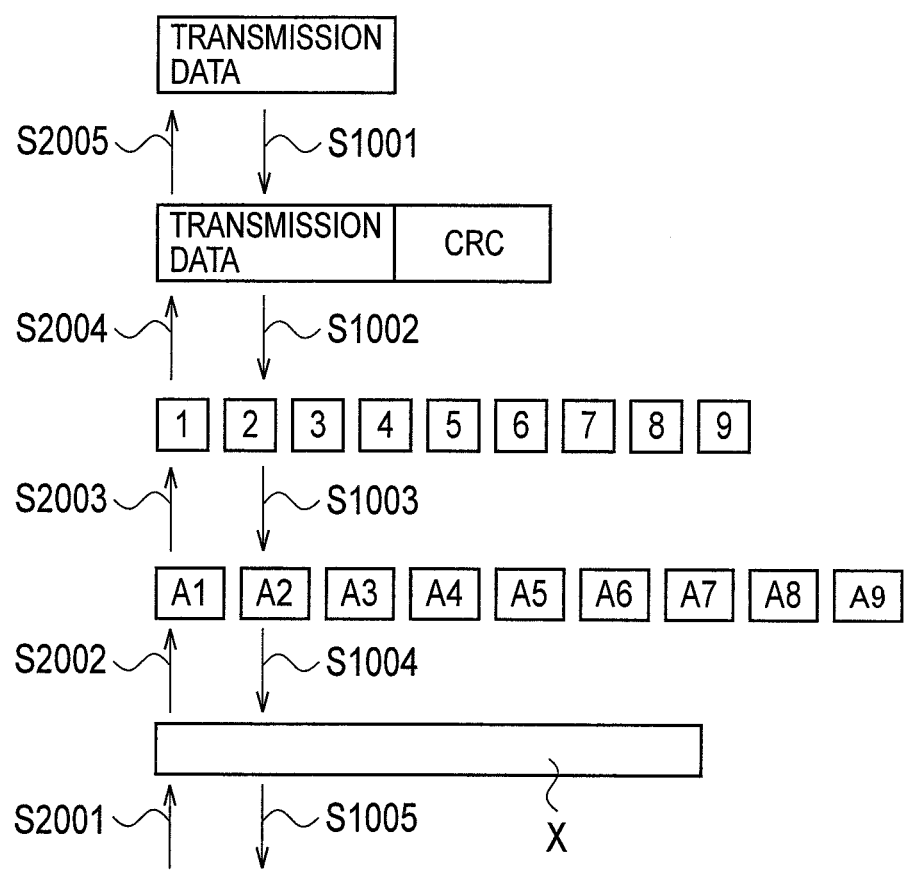
FIG. 2 is a diagram showing operations of the conventional transmitter apparatus and receiver apparatus.
Figure 3:
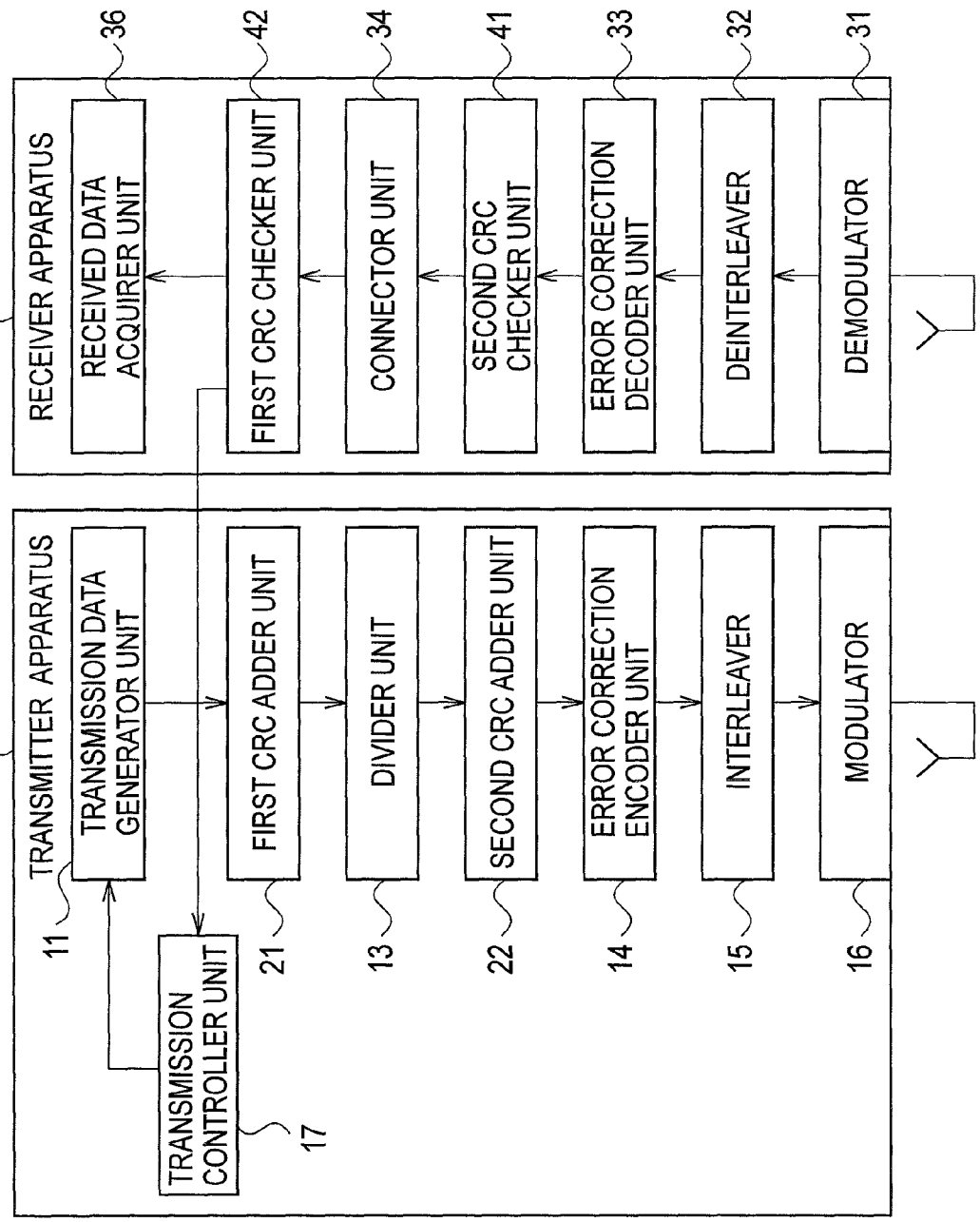
FIG. 3 is a functional block diagram of a transmitter apparatus and a receiver apparatus according to a first embodiment of the present invention.

With reference to FIGS. 3 and 4, a radio communication system according to a first embodiment of the present invention will be described. The radio communication system according to this embodiment is a system which exhibits a significant effect particularly when a temporal variation in a radio path is small relative to a total data transmission time.

In this embodiment, an example where a mobile terminal is used as a transmitter apparatus 10 will be described. However, it is obvious that the present invention is not limited to such an example.

As shown in FIG. 3, the transmitter apparatus 10 according to this embodiment includes a transmission data generator unit 11, a first CRC adder unit 21, a divider unit 13, a second CRC adder unit 22, an error correction encoder unit 14, an interleaver 15, a modulator 16, and a transmission controller unit 17.

The transmission data generator unit 11 is configured to generate transmission data (a bit sequence) in response to a user operation.

The first CRC adder 21 unit is configured to perform error detection encoding processing by using a CRC code for the transmission data (the bit sequence) generated by the transmission data generator unit 11. Specifically, the first CRC adder unit 21 is configured to add a first CRC code (a parity bit sequence) to the transmission data (the bit sequence) generated by the transmission data generator unit 11.

The divider unit 13 is configured to divide the transmission data (the bit sequence) to which the first CRC code (the parity bit sequence) has been added into multiple encoded bit sequences in units (bit size) for performing error correction encoding processing.

Here, the divider unit 13 may previously divide an encoded bit sequence to which a second CRC code is to be added (e.g., a leading encoded bit sequence in a leading group to be described later) so that the encoded bit sequence is reduced by a bit amount of the CRC code.

The second CRC adder unit 22 is configured to add the second CRC code (the parity bit sequence) to at least one of the encoded bit sequences divided by the divider unit 13.

To be more specific, the second CRC adder unit 22 may be configured to divide the encoded bit sequences divided by the divider unit 13 into groups (G1 to G3 in examples shown in FIGS. 4 to 6), and to add the second CRC code to one of the encoded bit sequences in at least one of the multiple groups (G1 to G3 in the examples shown in FIGS. 4 to 6).

Here, the number of encoded bit sequences in each of the groups, the number of groups or the like may be fixed or variable as long as the number is are shared as information between the transmitter apparatus 10 and a receiver apparatus 30.

For example, three encoded bit sequences may be set as one group. Alternatively, the number of groups may be set to 5 and the respective groups may be set to have the same number of encoded bit sequences. In this case, if there is a fraction, the number of encoded bit sequences may be controlled using the number of encoded bit sequences in the last group.

Moreover, in order to increase the possibility of acquisition of the first group, the number of encoded bit sequences only in the first group may be reduced. Alternatively, measures may be taken according to a movement speed in such a manner that the number of encoded bit sequences in each group is reduced when the movement speed is high and that the number of encoded bit sequences in each group is increased when the movement speed is low.

In this embodiment, as shown in FIG. 4, the second CRC adder unit 22 is configured to add the second CRC code to only a leading encoded bit sequence #A1 in the leading group G1 among the multiple groups G1 to G3.

The error correction encoder unit 14 is configured to perform error correction encoding processing for the encoded bit sequences outputted from the second CRC adder unit 22, and to output encoded bit sequences #A1 to #A9 to which redundant bits have been added.

The interleaver 15 is configured to perform interleaving processing for changing the order of bit sequences in transmission data X according to a certain rule, the transmission data X containing the encoded bit sequences #A1 to #A9 outputted from the error correction encoder unit 14.

The modulator 16 is configured to modulate the transmission data X containing the encoded bit sequences on which the error correction encoding processing and interleaving processing have been performed, and to transmit the transmission data through an antenna.

The transmission controller unit 17 is configured to instruct the transmission data generator unit 11 to retransmit data of encoded bit sequences specified by a first retransmission request (NACK) from the receiver apparatus 30, upon receipt of the retransmission request.

Moreover, the transmission controller unit 17 is configured to instruct the transmission data generator unit 11 to retransmit transmission data specified by a second retransmission request (NACK) from the receiver apparatus 30, upon receipt of the retransmission request.

Furthermore, the transmission controller unit 17 is configured to instruct the transmission data generator unit 11 to transmit transmission data to be transmitted next, upon receipt of transmission acknowledgement information (ACK) from the receiver apparatus 30.

The receiver apparatus 30 according to this embodiment includes a demodulator 31, a deinterleaver 32, an error correction decoder unit 33, a second CRC checker unit 41, a connector unit 34, a first CRC checker unit 42, and a received data acquirer unit 36.

The demodulator 31 is configured to demodulate a signal received through the antenna, and to acquire and output received data (a bit sequence).

The deinterleaver 32 is configured to perform deinterleaving processing for the received data outputted from the demodulator 31 according to a rule opposite to that adopted by the interleaver 15 described above.

The error correction decoder unit 33 is configured to divide the received data on which the deinterleaving processing has been performed into multiple encoded bit sequences (#A1 to #A9 in the examples shown in FIGS. 4 to 6), and to perform error correction decoding processing for the divided encoded bit sequences (#A1 to #A9 in the examples shown in FIGS. 4 to 6).

The second CRC checker unit 41 is configured to perform error detection processing (i.e., checking processing of the second CRC code) using the second CRC code added to one or more of the encoded bit sequences on which the error correction decoding processing has been performed.

Here, as described above, the second CRC code is added to one of encoded bit sequences (#1 to #9 in the examples shown in FIGS. 4 to 6) in at least one of the multiple groups (G1 to G3 in the examples shown in FIGS. 4 to 6).

In this embodiment, as shown in FIG. 4, the second CRC code is added to only the leading encoded bit sequence #1 in the leading group G1 among the multiple groups G1 to G3.

The connector unit 34 is configured to connect the multiple encoded bit sequences (#1 to #9 in the examples shown in FIGS. 4 to 6) described above, when no error is detected in the multiple encoded bit sequences, and to acquire transmission data to which the first CRC code has been added.

The first CRC checker unit 42 is configured to perform error detection processing using the first CRC code added to the transmission data described above. In other words, the first CRC checker unit 42 is configured to check the first CRC code.

Note that the first CRC checker 42 is configured to transmit a first retransmission request for a specific encoded bit sequence in the error detection processing by the first CRC checker unit 42 to the transmitter apparatus 10, upon detection of an error in the specific encoded bit sequence.

Moreover, the first CRC checker unit 42 is configured to transmit a second retransmission request for a specific transmission data in the error detection processing by the first CRC checker 42 to the transmitter apparatus 10, upon detection of an error in the specific transmission data.

The received data acquirer unit 36 is configured to acquire the transmission data from the first CRC checker unit 42, and to transfer the acquired transmission data to necessary functions in the receiver apparatus 30.

With reference to FIG. 4, a description is given below of operations of the radio communication system according to this embodiment.

As shown in FIG. 4, in the transmitter apparatus 10, the transmission data generator unit 11 generates transmission data (a bit sequence). In Step S101, the first CRC adder unit 21 performs error detection encoding processing using a CRC (Cyclic Redundant Check) code and thus adds a first CRC code (a parity bit sequence) to the transmission data (the bit sequence), in order to perform error detection processing in ARQ processing.

In Step S102, the divider unit 13 divides the transmission data (the bit sequence) to which the first CRC code (the parity bit sequence) has been added into encoded bit sequences #1 to #9 in units (bit size) for performing error correction encoding processing.

In Step S103, the second CRC adder unit 22 selects the leading encoded bit sequence #1 from among the divided multiple encoded bit sequences #1 to #9, calculates a CRC code, and adds the CRC code to the encoded bit sequence #1.

This is because, when a temporal variation in a radio path is small relative to a data transmission time, errors are considered to occur in almost all of the encoded bit sequences #1 to #9 rather than occurring in only one of the encoded bit sequences.

In Step S104, the error correction encoder unit 14 performs error correction encoding processing on the multiple encoded bit sequences #1 to #9. As a result, encoded bit sequences #A1 to #A9 to which redundant bits have been added are obtained.

In Step S105, the interleaver 15 performs interleaving for changing the order of the bit sequences in the transmission data containing the encoded bit sequences #A1 to #A9 according to a certain rule.

In Step S106, the modulator 16 digitally modulates transmission data X (containing the encoded bit sequences #A1 to #A9) outputted from the interleaver 15, and then transmits the transmission data to a radio section.

Meanwhile, in the receiver apparatus 30, as shown in FIG. 4, the demodulator 31 converts a received signal into received data (a bit sequence) by demodulating the received signal in Step S201.

In Step S202, the deinterleaver 32 changes the order of the bit sequences in the received data that is the output from the demodulator 31 back to the original order of the bit sequences in the transmission data X according to a rule opposite to that adopted by the interleaver 15 in the transmitter apparatus 10.

In Step S203, the error correction decoder unit 33 divides the received data (the bit sequences) outputted from the deinterleaver 32 into encoded bit sequences #A1 to #A9 in units that are the same as for the error correction encoding processing in the transmitter apparatus 10, and then performs error correction decoding processing.

In Step S204, when the error correction decoder unit 33 completes the error correction decoding processing for the leading encoded bit sequence #1, the second CRC checker unit 41 immediately performs error detection processing by determining whether or not the CRC code added to the encoded bit sequence #1 is correct.

When an error is detected based on the result of the determination on whether or not the CRC code is correct for the leading encoded bit sequence #1, a first retransmission request (NACK) is sent back to the transmitter apparatus 10.

When no error is detected based on the result of the determination on whether or not the CRC code is correct for the leading encoded bit sequence #1, the error correction decoder unit 33 keeps on performing decoding processing on all the other encoded bit sequences #2 to #8.

In Step S205, when the error correction decoder unit 33 completes the decoding processing for all the encoded bit sequences #1 to #9, the connector unit 34 reproduces the transmission data to which the first CRC code has been added by connecting all the encoded bit sequences #1 to #9.

In Step S206, the first CRC checker unit 42 again performs error detection processing using the first CRC code, when the transmission data described above is reproduced.

The first CRC checker unit 42 sends transmission acknowledgement information (ACK) or a second retransmission request (NACK) back to the transmitter apparatus 10, based on the result of the error detection processing.

With the radio communication system according to this embodiment, the receiver apparatus 30 is allowed to send back a first retransmission request (NACK) without receiving all the encoded bit sequences constituting the transmission data. Thus, the radio communication system can reduce a delay time compared with the conventional radio communication system.

Second Embodiment of the Invention

With reference to FIGS. 3 and 5, a radio communication system according to a second embodiment of the present invention will be described. The radio communication system according to this embodiment will be described below mainly about a difference from the radio communication system according to the first embodiment described above.

In this embodiment, as shown in FIG. 5, the second CRC adder unit 22 in the transmitter apparatus 10 is configured to add second CRC codes to leading encoded bit sequences #1, #4 and #7 in the respective groups G1 to G3.

The operation shown in FIG. 5 is the same as that shown in FIG. 4 except for the point that the second CRC codes are added to the leading encoded bit sequences #1, #4 and #7 in the respective groups G1 to G3. Thus, a description for the operation shown in FIG. 5 is omitted here.

Third Embodiment of the Invention

With reference to FIGS. 3 and 6, a radio communication system according to a third embodiment of the present invention will be described. The radio communication system according to this embodiment will be described below mainly about a difference from the radio communication systems according to the first and second embodiments described above.

In this embodiment, as shown in FIG. 6, the second CRC adder unit 22 in the transmitter apparatus 10 is configured to add second CRC codes to encoded bit sequences #1, #5 and #9 in the respective groups G1 to G3.

Specifically, in this embodiment, the second CRC adder unit 22 in the transmitter apparatus 10 is configured to add second CRC codes to predetermined encoded bit sequences among the encoded bit sequences #1 to #9 in the respective groups, the predetermined encoded bit sequences being selected according to a rule prescribed between the transmitter apparatus 10 and the receiver apparatus 30.

Note that the second CRC adder unit 22 in the transmitter apparatus 10 may be configured not to add a second CRC code to an encoded bit sequence in a specific group.

The operation shown in FIG. 6 is the same as that shown in FIG. 4 except for the point that the second CRC codes are added to the predetermined encoded bit sequences #1, #5 and #9 among the encoded bit sequences #1 to #9 in the respective groups, the predetermined encoded bit sequences being selected according to the rule prescribed between the transmitter apparatus 10 and the receiver apparatus 30. Thus, a description for the operation shown in FIG. 6 is omitted here.

The present invention has been described above in detail with regard to the embodiments. It is apparent to those skilled in the art that the present invention is not limited to the embodiments described herein. The present invention can be implemented as modified and altered embodiments without departing from the spirit and scope of the present invention defined in the description of the claims. Therefore, the disclosure herein merely aims at exemplary explanation, and is not intended to limit the present invention in any way The content of Japanese Patent Application No. 2007-213183 (filed on Aug. 17, 2007) is incorporated herein by reference in its entirety.

INDUSTRIAL APPLICABILITY

Thus, a data transmission method, a data reception method, a mobile terminal and a radio communication system according to the present invention are useful, because a delay time required by a receiver apparatus to detect an error and to return ACK/NACK to a transmitter apparatus can be reduced as much as possible for more real-time data transmission.

The invention claimed is:

1. A data transmission method comprising the steps of: (A) adding a first CRC code to transmission data; (B) dividing the transmission data to which the first CRC code has been added into a plurality of encoded bit sequences; (C) adding a second CRC code to at least one of the divided encoded bit sequences, wherein the divided encoded bit sequences are grouped into a plurality of groups, and the second CRC code is added to any of the encoded bit sequences in at least one of the plurality of groups; (D) performing error correction encoding processing on the encoded bit sequences; and (E) transmitting the encoded bit sequences on which the error correction encoding processing has been performed.

2. The data transmission method according to claim 1, wherein
in the step (C), the second CRC code is added to any of the encoded bit sequences in each of the plurality of groups.

3. The data transmission method according to claim 1, wherein
in the step (C), the second CRC code is added to any of the encoded bit sequences in a leading group among the plurality of groups.

4. The data transmission method according to claim 3, wherein
in the step (C), the second CRC code is added to a leading one of the encoded bit sequences in the leading group among the plurality of groups.

5. A data reception method comprising the steps of: dividing received data into a plurality of encoded bit sequences, and performing error correction decoding processing on the divided encoded bit sequences; performing error detection processing, by using the second CRC code added to one or more of the encoded bit sequences on which the error correction decoding processing is performed, wherein the second CRC code is added to any of the encoded bit sequences in at least one of a plurality of groups; transmitting a first retransmission request for a specific encoded bit sequence, when an error is detected in the specific encoded bit sequence; acquiring transmission data to which a first CRC code has been added by connecting the plurality of encoded bit sequences, when no error is detected in the plurality of encoded bit sequences; performing error detection processing by using the first CRC code; and transmitting a second retransmission request for the transmission data, when an error is detected in the transmission data.

6. The data reception method according to claim 5, wherein
the second CRC code is added to any of the encoded bit sequences in each of the plurality of groups.

7. The data reception method according to claim 5, wherein
the second CRC code is added to any of the encoded bit sequences in a leading group among the plurality of groups.

8. The data reception method according to claim 7, wherein
the second CRC code is added to a leading one of the encoded bit sequences in the leading group among the plurality of groups.

9. A mobile terminal comprising: a first CRC adder unit configured to add a first CRC code to transmission data; a divider unit configured to divide the transmission data to which the first CRC code has been added into a plurality of encoded bit sequences; a second CRC adder unit configured to add a second CRC code to at least one of the divided encoded bit sequences, wherein the second CRC adder unit is configured to group the divided encoded bit sequences into a plurality of groups, and to add the second CRC code to any of the encoded bit sequences in at least one of the plurality of groups; an error correction encoder unit configured to perform error correction encoding processing on the encoded bit sequences; and a transmitter unit configured to transmit the encoded bit sequences on which the error correction encoding processing has been performed.

10. A radio communication system including a transmitter apparatus and a receiver apparatus, wherein the transmitter apparatus comprises: a first CRC adder unit configured to add a first CRC code to transmission data; a divider unit configured to divide the transmission data to which the first CRC code has been added into a plurality of encoded bit sequences; a second CRC adder unit configured to add a second CRC code to at least one of the divided encoded bit sequences, wherein the second CRC adder unit is configured to group the divided encoded bit sequences into a plurality of groups, and to add the second CRC code to any of the encoded bit sequences in at least one of the plurality of groups; an error correction encoder unit configured to perform error correction encoding processing on the encoded bit sequences; and a transmitter unit configured to transmit the encoded bit sequences on which the error correction encoding processing has been performed; and the receiver apparatus comprises: an error correction decoder unit configured to divide received data into a plurality of encoded bit sequences, and to perform error correction decoding processing on the divided encoded bit sequences; a second CRC checker unit configured to perform error detection processing by using the second CRC code added to one or more of the encoded bit sequences on which the error correction decoding processing has been performed; a first retransmission requester unit configured to transmit a first retransmission request for a specific encoded bit sequence, when no error is detected in the specific encoded bit sequence; a connector unit configured to connect the plurality of encoded bit sequences, when no error is detected in the plurality of encoded bit sequences, and to acquire transmission data to which a first CRC code has been added; a first CRC checker unit configured to perform error detection processing by using the first CRC code; and a second retransmission requester unit configured to transmit a second retransmission request for the transmission data, when an error is detected in the transmission data.

* * * * *